United States Patent
Schulze

(10) Patent No.: US 11,977,728 B1
(45) Date of Patent: May 7, 2024

(54) INTERFACE-INTEGRATED PERMISSIONS CONFIGURATION

(71) Applicant: Lifetrack Medical Systems Private Ltd., Singapore (SG)

(72) Inventor: Eric Schulze, Taguig (PH)

(73) Assignee: Lifetrack Medical Systems Private Ltd., Singapore (SG)

( * ) Notice: Subject to any disclaimer, the term of this patent is extended or adjusted under 35 U.S.C. 154(b) by 33 days.

(21) Appl. No.: 18/145,533

(22) Filed: Dec. 22, 2022

(51) Int. Cl.
G06F 21/60 (2013.01)
G06F 3/0482 (2013.01)
G06F 3/04847 (2022.01)

(52) U.S. Cl.
CPC ........ *G06F 3/04847* (2013.01); *G06F 3/0482* (2013.01); *G06F 21/604* (2013.01)

(58) Field of Classification Search
CPC ... G06F 3/0482; G06F 3/04847; G06F 21/604
See application file for complete search history.

(56) References Cited

U.S. PATENT DOCUMENTS

| | | | |
|---|---|---|---|
| 6,460,141 B1 | 10/2002 | Olden | |
| 9,276,958 B2 | 3/2016 | Hagiwara et al. | |
| 9,705,931 B1 | 7/2017 | Schulze et al. | |
| 10,242,232 B1 * | 3/2019 | Hurry | H04L 63/107 |
| 10,339,286 B2 | 7/2019 | Schulze et al. | |
| 10,642,451 B2 | 5/2020 | Schulze et al. | |
| 10,650,127 B2 | 5/2020 | Schulze et al. | |
| 10,681,051 B2 * | 6/2020 | Rowden | H04L 63/10 |
| 11,334,373 B2 | 5/2022 | Schulze et al. | |
| 11,599,372 B2 | 3/2023 | Schulze et al. | |
| 2002/0157023 A1 | 10/2002 | Callahan et al. | |
| 2005/0075544 A1 | 4/2005 | Shapiro | |

(Continued)

FOREIGN PATENT DOCUMENTS

| | | | | |
|---|---|---|---|---|
| CA | 3095339 A1 * | 10/2019 | | G06F 21/31 |
| CN | 104091130 | 10/2014 | | |

(Continued)

OTHER PUBLICATIONS

Australian Examination Report for Australian Application No. 2017296139, dated Sep. 10, 2019, 7 pages.

(Continued)

*Primary Examiner* — Shourjo Dasgupta
(74) *Attorney, Agent, or Firm* — Fish & Richardson P.C.

(57) ABSTRACT

A method includes outputting a first version of a user interface. User interface elements in the first version of the user interface are presented with at least one visual characteristic indicating whether or not the user interface elements are included in an available plurality of user interface elements, and the first version of the user interface has a matching look and feel compared to a second version of the user interface. The method includes receiving a selection interaction with a user interface element; and, in response to the selection interaction, configuring whether the user interface element is included in the first available plurality of user interface elements, and altering the at least one visual characteristic of the user interface element to indicate the user interface element's updated inclusion or updated non-inclusion in the available plurality of user interface elements.

20 Claims, 11 Drawing Sheets

(56) References Cited

U.S. PATENT DOCUMENTS

| | | | |
|---|---|---|---|
| 2007/0288890 A1* | 12/2007 | Wells | G06F 8/38 717/113 |
| 2008/0046442 A1 | 2/2008 | Grason | |
| 2009/0254656 A1* | 10/2009 | Vignisson | G06F 16/9535 709/224 |
| 2009/0300544 A1 | 12/2009 | Psenka | |
| 2010/0070897 A1 | 3/2010 | Aymeloglu | |
| 2011/0167342 A1* | 7/2011 | de la Pena | G06F 3/0488 715/764 |
| 2011/0213634 A1 | 9/2011 | Karakey | |
| 2011/0277017 A1 | 11/2011 | Ivanov et al. | |
| 2012/0290920 A1 | 11/2012 | Crossley | |
| 2012/0291102 A1* | 11/2012 | Cohen | G06F 21/57 726/4 |
| 2013/0014212 A1* | 1/2013 | Cohen | G06F 21/6218 726/1 |
| 2013/0097261 A1* | 4/2013 | Baer | H04L 51/212 709/206 |
| 2013/0263001 A1* | 10/2013 | Doronichev | G06F 21/554 715/719 |
| 2014/0215604 A1 | 7/2014 | Giblin | |
| 2015/0320365 A1 | 11/2015 | Schulze et al. | |
| 2015/0324075 A1 | 11/2015 | Schulze et al. | |
| 2016/0019288 A1* | 1/2016 | Knechtel | G06F 21/6227 707/736 |
| 2016/0124581 A1 | 5/2016 | Schulze et al. | |
| 2016/0328577 A1 | 11/2016 | Howley | |
| 2017/0329589 A1* | 11/2017 | Kominar | H04W 88/02 |
| 2018/0018448 A1 | 1/2018 | Schulze et al. | |
| 2018/0060601 A1* | 3/2018 | Kay | H04W 12/08 |
| 2018/0150650 A1* | 5/2018 | Saunders | H04L 63/104 |
| 2018/0188930 A1* | 7/2018 | Ji | H04L 67/1095 |
| 2019/0138161 A1 | 5/2019 | Schulze et al. | |
| 2019/0311091 A1 | 10/2019 | Schulze et al. | |
| 2020/0028877 A1* | 1/2020 | Tiwari | G06F 21/604 |
| 2020/0272285 A1 | 8/2020 | Schulze et al. | |
| 2020/0285761 A1* | 9/2020 | Buck | G06F 21/604 |
| 2020/0293637 A1 | 9/2020 | Schulze et al. | |
| 2021/0157978 A1* | 5/2021 | Haramati | G06F 40/177 |
| 2022/0350623 A1 | 11/2022 | Schulze et al. | |
| 2023/0216858 A1* | 7/2023 | Chen | H04L 63/1408 726/4 |
| 2023/0402065 A1* | 12/2023 | Gu | G06F 3/04842 |
| 2024/0012899 A1* | 1/2024 | Mao | G06F 21/6218 |

FOREIGN PATENT DOCUMENTS

| | | | | |
|---|---|---|---|---|
| CN | 109670322 A | * | 4/2019 | G06F 21/604 |
| CN | 107644036 B | * | 6/2021 | G06F 16/00 |
| DE | 60313106 T2 | * | 12/2007 | G06F 21/604 |
| WO | WO 2015/095597 | | 6/2015 | |
| WO | WO 2018/011717 | | 1/2018 | |

OTHER PUBLICATIONS

Australian Examination Report for Australian Application No. 2018359869, dated Oct. 2, 2020, 5 pages.

Dolgobrod, Maxim, "Developing a user interface for a cross-platform web application", Helsinki Metropolia University of Applied Sciences, Master's Thesis, Information Technology, May 30, 2013 (99 pages).

Indian Examination Report in Indian Application. No. 201947003415, dated Aug. 14, 2020, 6 pages.

International Preliminary Report on Patentability for International Application No. PCT/US2018/059392, dated May 12, 2020, 14 pages.

International Search Report and Written Opinion from PCT application PCT/US2018/059392, dated Jan. 29, 2019, 15 pages.

Samarati et al., "Access control: Policies, Models, and Mechanisms," Foundations of Security Analysis and Design: Tutorial Lectures, Sep. 2000, 2171: 137-196.

Sandhu et al., "Access control: principle and practice," IEEE Communications Magazine, Sep. 1994, 32(9): 40-48.

USPTO Transaction History for U.S. Appl. No. 15/209,486, filed Jul. 13, 2016, 140 pages.

USPTO Transaction History for U.S. Appl. No. 15/635,089, filed Jun. 27, 2017, 296 pages.

* cited by examiner

FIG. 2

| Patient Name | Patient age | Patient Sex | Modality | Body Part |
|---|---|---|---|---|
| Lorem | 68Y0M | M | | |
| Itsum | 19Y5M | F | | |
| Dolor | 68Y0M | M | | |
| Sit | 82Y9M | M | | |
| Viverra quis | 50Y8M | F | MG | BREAST |
| Feutiat | 34Y1M | F | DX | T SPINE |
| Tellus | 81Y11M | F | DX | CHEST PA |
| Phasellus | | M | DX | CHEST |
| Viverra | 97Y11M | F | CR | CHEST |
| Laoreet | 23Y1M | M | DX | CHEST |
| Quistue rutrum | 26Y5M | F | DX | CHEST |
| Rhoncus | 40Y5M | M | DX | HAND |
| Maecenas | 34Y8M | M | DX | CHEST |
| Nam vuam | 33Y6M | F | CT, SR | ABDOMEN |
| Donec vitae | | M | CT, SR | ABDPELVIS |
| Duis leo | | F | CT | |
| Sed frintilla eros | | M | CT | ABDPELVIS |
| Tincidunt | | F | CT | NECK |
| Blandit vel | | M | CT, SR | ABDOMEN |
| Aenean | | M | CT | ABDOMEN |
| Imierdiet | | F | CT, SR | ABDOMEN |
| Alituam | | F | CT | ABDOMEN |
| Elementum | | M | DX | ABDOMEN |
| Aenean vulutate | 41Y5M | F | DX | CHEST |
| Hendrerit | 65Y4M | M | | HAND |
| Nullam dictum | 82Y8M | M | | |
| Tinavarial | 82Y8M | M | | |
| Conserwuat | 82Y8M | M | | |
| Orci etet | | | | |
| Faucibus | | | | |

| | Patient Name | Status | Prior | Mod | Mods in Study | Body Part | # | AS# | #1 |
|---|---|---|---|---|---|---|---|---|---|
| | Lorem 302 | Scheduled | | | OT | 204 | | | 0 |
| | Itsum | Scheduled | | | OT | | | | 0 |
| | Dolor | Scheduled | | | OT | | | | 0 |
| | Sit | Final | 04fe4314 | DX | DX | CHEST | 7 | 1 | 1 |
| | Viverra quis | Scheduled | | | OT | | 1 | | 0 |
| | Feutiat | Final | 04fe4314 | DX | DX | CHEST | 7 | 1 | 1 |
| | Tellus | Comparison | 2940f730 | DX, SR | DX\SR | CHEST | 8 | 1 | 2 |
| | Phasellus | Final | 2940f730 | DX | DX | ABDOMEN | 7 | 1 | 1 |
| | Viverra | Final | 2940f730 | DX | DX | CHEST | 7 | 1 | 1 |
| | Laoreet | Final | 90c0e4b9 | CT, SR | CT\SR | CSPINE | 7 | 784 | 784 |
| | Quistue rutrum | Comparison | 04fe4314 | DX | DX | CHEST | 8 | 1 | 1 |
| | Rhoncus | Final | 90c0e4b9 | CT, SR | CT\SR | HEAD | 7 | 186 | 186 |
| | Maecenas | Final | 04fe4314 | DX | DX | CHEST | 7 | 2 | 2 |
| | Nam vuam | Final | e127dcf0 | CT, SR | CT\SR | HEAD | 7 | 195 | 195 |

FIG. 3

| | Patient Name | Status | Prior | Mod | Mods in Study | Body Part | # | AS# | #1 |
|---|---|---|---|---|---|---|---|---|---|
| ☐ | Lorem | Scheduled | | | OT | | | | 0 |
| ☐ | Itsum | Scheduled | | | OT | | | | 0 |
| ☐ | Dolor | Scheduled | | | OT | | | | 0 |
| ☐ | Sit | Final | 04fe4314 | DX | DX | CHEST | 7 | 1 | 1 |
| ☐ | Viverra quis | Scheduled | | | OT | | 1 | | 0 |
| ☐ | Feutiat | Final | 04fe4314 | DX | DX | CHEST | 7 | 1 | 1 |
| ☐ | Tellus | Comparison | 2940f730 | DX, SR | DX\SR | CHEST | 8 | 1 | 2 |
| ☐ | Phasellus | Final | 2940f730 | DX | DX | ABDOMEN | 7 | 1 | 1 |
| ☐ | Vivera | Final | 2940f730 | DX | DX | CHEST | 7 | 1 | 1 |
| ☐ | Laoreet | Final | 90c0e4b9 | CT, SR | CT\SR | CSPINE | 7 | 784 | 784 |
| ☐ | Quistue rutrum | Comparison | 04fe4314 | DX | DX | CHEST | 8 | 1 | 1 |
| ☐ | Rhoncus | Final | 90c0e4b9 | CT, SR | CT\SR | HEAD | 7 | 186 | 186 |
| ☐ | Maecenas | Final | 04fe4314 | DX | DX | CHEST | 7 | 2 | 2 |
| ☐ | Nam vuam | Final | e127dcf0 | CT, SR | CT\SR | HEAD | 7 | 195 | 195 |

FIG. 4

| age ▽ | AET ▽ | Sex ▽ | | QA Status ▽ | CPT ▽ |
|---|---|---|---|---|---|
| 68Y0M | 306 | M | | | |
| 19Y5M | 204 | F | | | |
| 68Y0M | | M | | | |
| 57Y0M | RRD_AGH_001 | F | | | 71010 |
| 82Y9M | | M | | | |
| 57Y0M | RRD_AGH_001 | F | | | 71010 |
| 43Y3M | RRD_AGH_001 | M | | | |
| 43Y3M | RRD_AGH_001 | M | | | 74000 |
| 43Y3M | RRD_AGH_001 | M | | | 71010 |
| 85Y6M | RRD_AGH_001 | F | | | 72125 |
| 57Y0M | RRD_AGH_001 | F | | | |
| 85Y6M | RRD_AGH_001 | F | | | 70450 |
| 57Y0M | RRD_AGH_001 | F | | | 71010 |
| 89Y5M | RRD_AGH_001 | F | | | 70450 |

| Patient Name | Patient age | Patient Sex | Modality | Body Part | AET |
|---|---|---|---|---|---|
| Lorem | 68Y0M | M | | | |
| Itsum | 19Y5M | F | | | |
| Dolor | 68Y0M | M | | | |
| Sit | 82Y9M | M | | | |
| Viverra quis | 50Y8M | F | MG | BREAST | |
| Feutiat | 34Y1M | F | DX | T SPINE | RRD_AGH_001 |
| Tellus | 81Y11M | F | DX | CHEST PA | RRD_AGH_001 |
| Phasellus | | M | DX | CHEST | RRD_AGH_001 |
| Viverra | 97Y11M | F | CR | CHEST | RRD_AGH_001 |
| Laoreet | 23Y1M | M | DX | CHEST | RRD_AGH_001 |
| Quistue rutrum | 26Y5M | F | DX | CHEST | RRD_AGH_001 |
| Rhoncus | 40Y5M | M | DX | HAND | RRD_AGH_001 |
| Maecenas | 34Y8M | M | DX | CHEST | RRD_AGH_001 |
| Nam vuam | 33Y6M | F | CT, SR | ABDOMEN | LIFETRACK |
| Donec vitae | | F | CT, SR | ABDPELVIS | RRD_AGH_001 |
| Duis leo | | M | CT | | RRD_AGH_001 |
| Sed fritilla eros | | M | CT | ABDPELVIS | RRD_AGH_001 |
| Tincidunt | | F | CT | NECK | RRD_AGH_001 |
| Blandit vel | | M | CT, SR | ABDOMEN | RRD_AGH_001 |
| Aenean | | M | CT | ABDOMEN | RRD_AGH_001 |
| Imierdiet | | F | CT | ABDOMEN | RRD_AGH_001 |
| Alituam | | F | CT, SR | ABDOMEN | RRD_AGH_001 |
| Elementum | | M | DX | CHEST | RRD_AGH_001 |
| Aenean vullutate | | F | DX | HAND | RRD_AGH_001 |
| Hendrerit | | M | | | |
| Nullam dictum | 41Y5M | M | | | |
| Tinavarial | 65Y4M | F | | | |
| Consevwuat | 82Y8M | M | | | |
| Orci etet | 82Y8M | M | | | |
| Faucibus | 82Y8M | M | | | |

INTERFACE-INTEGRATED PERMISSIONS CONFIGURATION

FIELD OF THE DISCLOSURE

The present disclosure relates to permissioning processes for computer applications.

BACKGROUND

In computer applications, different users have access to different functions and data. In permissioning processes, a user can set access levels for one or more other users.

SUMMARY

Some aspects of this disclosure describe a computer-implemented method. The method includes receiving, from a first user account, a request to configure feature permissions for a second user account. The method includes, in response to the request, outputting a first version of a user interface. The first version of the user interface is accessible by the first user account and is inaccessible by the second user account. User interface elements in the first version of the user interface are presented with at least one visual characteristic indicating whether or not the user interface elements are included in a first available plurality of user interface elements. The first available plurality of user interface elements is a set of user interface elements available for inclusion in the user interface as output to the second user account. The first version of the user interface has a matching look and feel compared to a second version of the user interface that is accessible to the second user account. The method includes receiving, from the first user account, a selection interaction with a first user interface element in the first version of the user interface; and, in response to the selection interaction, if the first user interface element is not included in the first available plurality of user interface elements, adding the first user interface element to the first available plurality of user interface elements, or, if the first user interface element is included in the first available plurality of user interface elements, removing the first user interface element from the first available plurality of user interface elements. The method includes, in response to the selection interaction, altering the at least one visual characteristic of the first user interface element to indicate the first user interface element's updated inclusion or updated non-inclusion in the first available plurality of user interface elements.

Implementations of this and other methods can have one or more of at least the following characteristics.

In some implementations, the selection interaction includes a first type of selection interaction, and the method includes: receiving, from the first user account, a second type of selection interaction with the first user interface element; and, in response to the second type of selection interaction, executing a function associated with the first user interface element.

In some implementations, the first type of selection interaction includes a first type of click, and the second type of selection interaction includes a second type of click.

In some implementations, the function associated with the first user interface element is a function executed when the second user account performs the second type of selection interaction with the first user interface element in the second version of the user interface.

In some implementations, the function associated with the first user interface element includes opening a sub-menu.

In some implementations, the first version of the user interface includes a permissioning interface, and wherein the second version of the user interface includes a standard interface.

In some implementations, the at least one visual characteristic includes a color.

In some implementations, the matching look and feel include the first user interface element being the same type of user interface element in the first version and the second version.

In some implementations, the first user interface element is included in a collection of user interface elements, and the matching look and feel includes the collection of user interface elements having the same placement in the first version and the second version.

In some implementations, the matching look and feel includes the first user interface element having the same relative placement, with respect to a second user interface element, in the first version and the second version.

In some implementations, the first user interface element is associated with a type of data, such that adding the first user interface element to the first available plurality of user interface elements includes permitting the second user account to view the type of data when viewing the user interface.

In some implementations, the first user interface element is associated with a function, such that adding the first user interface element to the first available plurality of user interface elements includes permitting the second user account to perform the function when viewing the user interface.

In some implementations, the method includes, subsequent to adding the first user interface element to the first available plurality of user interface elements or removing the first user interface element from the first available plurality of user interface elements, outputting, to the second user account, the second version of the user interface. Outputting the second version of the user interface includes transmitting, to a device associated with the second user account, data representative of the first user interface element.

In some implementations, based on the first user interface element being added to the first available plurality of user interface elements, the second user account is permitted to add the first user interface element to the second version of the user interface.

In some implementations, the first user interface element includes a header of a data column.

In some implementations, the method includes receiving, from the second user account, a request to configure feature visibility for the user interface. The method includes, in response to the request to configure feature visibility, outputting a third version of the user interface. User interface elements in the third version of the user interface are presented with at least one visual characteristic indicating whether or not the user interface elements are included in an exposed plurality of user interface elements for the interface. The exposed plurality of user interface elements is a set of user interface elements included in the second version of the user interface. The method includes receiving, from the second user account, a second selection interaction with a second user interface element in the third version of the user interface. The method includes, in response to the second selection interaction, if the second user interface element is not included in the exposed plurality of user interface elements, adding the second user interface element to the exposed plurality of user interface elements, or, if the second user interface element is included in the exposed plurality of user interface elements, removing the second user interface element from the exposed plurality of user interface elements. The method includes, in response to the selection interaction, altering the at least one visual characteristic of the second user interface element to indicate the second user interface element's updated inclusion or updated non-inclusion in the exposed plurality of user interface elements.

Other implementations of this and other aspects include corresponding systems, apparatuses, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions. The apparatuses may include a wireless router, a wireless access point, a cellular phone, a cellular base station, or a software radio.

All or part of the features described throughout this disclosure can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other aspects, features and advantages will be apparent from the description and drawings, and from the claims.

BRIEF DESCRIPTION OF THE DRAWINGS

FIG. 2 is an example of a version of a user interface.
FIGS. 3-4 are examples of a version of a user interface.
FIG. 5 is an example of a version of a user interface.
FIGS. 6A-6C are examples of interaction with a user interface.

DETAILED DESCRIPTION

This disclosure relates to permissioning operations for computer applications, such as web applications, mobile applications, and desktop computer applications. Different users of an application are often presented with different options for interacting with the application and/or different levels of access to data within the application. For example, different users may have different roles (e.g., in an organization associated with the application), and those roles may dictate different application experiences. These different experiences may be reflected in user interfaces and interface elements presented to different users. For example, if a user lacks permission to use a search tool, an icon corresponding to the search tool may be absent from their user interface. As another example, if a user lacks permission to view a certain type of data, a column presenting that type of data may be missing from a table viewable by the user in an application.

However, configuring user permissions according to some existing methods can be confusing and time-consuming. Often, permissioning is performed using a dedicated user interface, e.g., in a list form in which different permissions are toggled on/off. Because the permissioning interface is disassociated from interfaces that users will actually view/use in the context of typical application usage, relevant permissions may be overlooked (e.g., because the permissioning user does not understand which application elements may be relevant for a given page) and/or incorrectly configured (e.g., because, with the permissioning interface different from the configured application interface, the mapping between permission configurations and corresponding results for users may be difficult to understand).

Implementations according to this disclosure facilitate permissioning of interfaces directly in the interfaces themselves by interaction with interface elements. For example, to configure access to a measurement functionality in an image viewing interface, a permissioning user can load a version of the image viewing interface and interact with (e.g., click) an interface element that activates the measurement functionality. As a result of these and other processes described herein, permissioning can be made more efficient, more user-friendly, and less prone to error.

Figure 1:
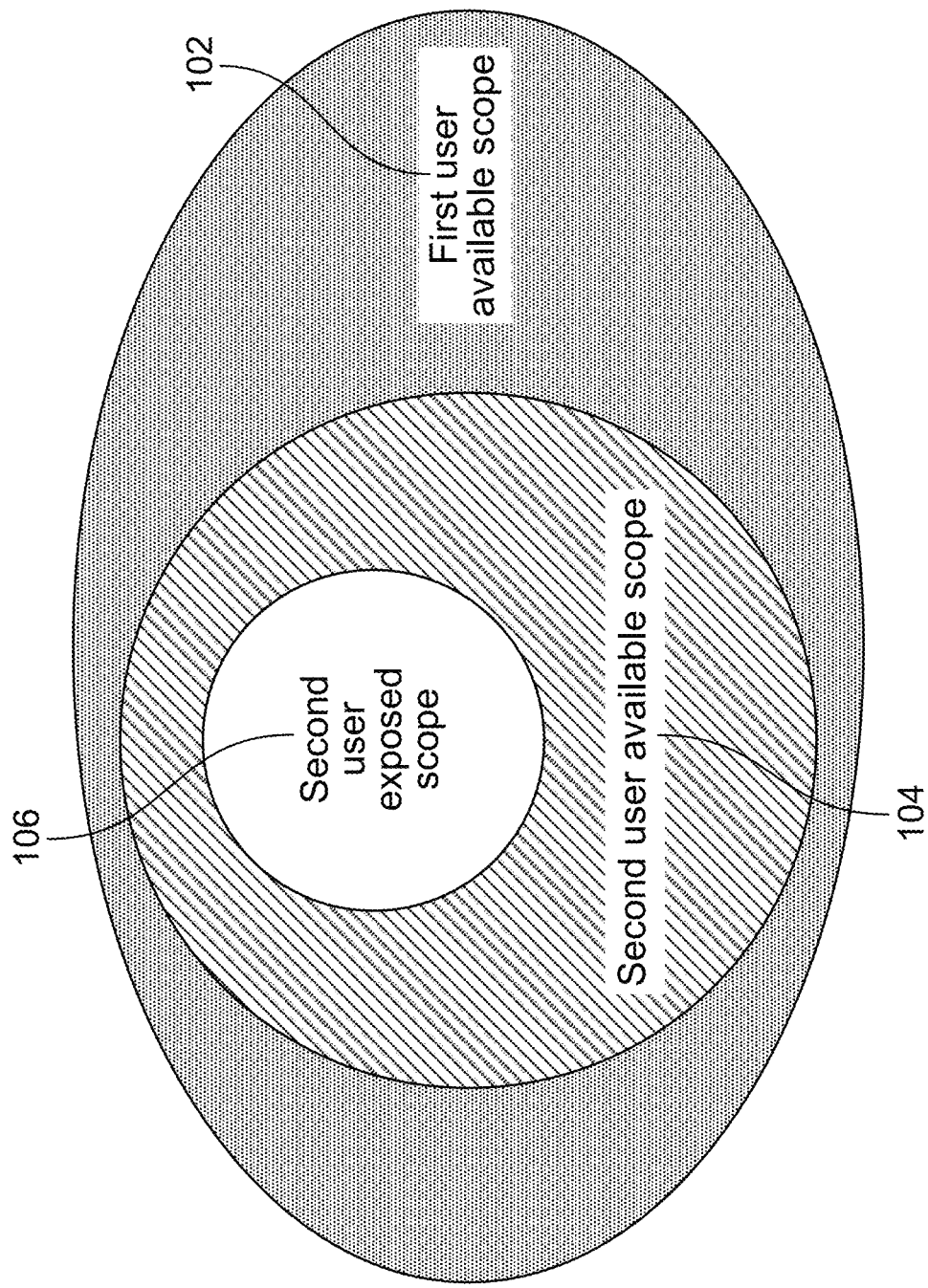
FIG. 1 is a diagram illustrating interface element scopes.

FIG. 1 illustrates an example of sets of interface "scopes" usable in conjunction with implementations of this disclosure. A scope is a set of interface elements that may include zero, one, or more than one interface element. In the example of FIG. 1, a second user's exposed scope 106 is a subset of the second user's available scope 104, which is a subset of a first user's available scope 102. In the implementations described herein, the first user performs a permissioning process for the second user. The permissioning process is sometimes referred to as a "scoping process" or an "account cropping" process, because permissioning involves adjusting/cropping interface element scope(s) associated with the second user. The permissioning process includes determining which interface element(s) are to be included in the second user's available scope 104 (and, in some implementations, which of those interface element(s) are to be included in the second user's exposed scope 106).

In this example, the scopes are scopes for a particular page/interface of an application. The second user's exposed scope 106 is the set of interface elements that are presented to the second user when the second user views the interface. The second user's available scope 104 is the set of interface elements that are available for presentation to the second user (at the second user's discretion) when the second user views the interface. For example, the second user may decide that a first interface element, while available for presentation, is not useful for the second user's work, so the second user can configure the first interface element to not be presented when the second user views the interface (can exclude the first interface element from the second user's exposed scope 106). For example, the second user can open one or more menus of the application and configure, in the menus, which interface elements from the second user's available scope 104 are presented or not presented. As described below, in some implementations the second user can open an interface similar to the interfaces described herein in reference to permissioning, to configure which interface elements are presented or not presented.

In some implementations, as in this example, the first user's available scope 102 includes at least the second user's available scope 104 and can include at least one interface element that is not included in the second user's available scope 104. That is, there can be a first interface element that the first user may decide to display in the interface, that the second user cannot decide to display in the interface, because the first interface element is excluded from the second user's available scope 104 but included in the first user's available scope 102.

In some implementations, when the first user performs permissioning for the second user, the permissioning is restricted based on one or both users' available scopes 102, 104. In some implementations, the first user may only add to the second user's available scope 104 interface element(s) that are in the first user's available scope 102. That is, the first user may only grant the second user access to interface elements to which the first user has access. This restriction can enhance security by imposing bounds on which users are permitted to grant access to certain interface elements.

In some implementations, the second user's available scope 104 need not be a subset of the first user's available scope 102. In such cases, the first user can be restricted to configuring permissions only for interface elements that are in the first user's available scope 102. For example, if a first interface element is excluded from the first user's available scope 102, the first user cannot add the first interface element to the second user's available scope 104. Similarly, if a second interface element is included in the second user's available scope 104 but excluded from the first user's available scope 102, the first user cannot remove the second interface element from the second user's available scope 104.

As described above, the second user's exposed scope 106 need not be a universal exposed scope that applies to all pages of the application but, rather, can be a page-specific exposed scope that differs from exposed scope(s) for other page(s). For each page, in some implementations, the second user may select a subset, or all, of the interface elements of the second user's available scope 104 to be in the exposed scope for that page (in some implementations, subject to whether the interface elements are compatible with the page—for example, it may not be permitted to include an image analysis tool in a page focused on user billing). An interface element included in an exposed scope for a first page need not be included in an exposed scope for a second page.

Figure 7:
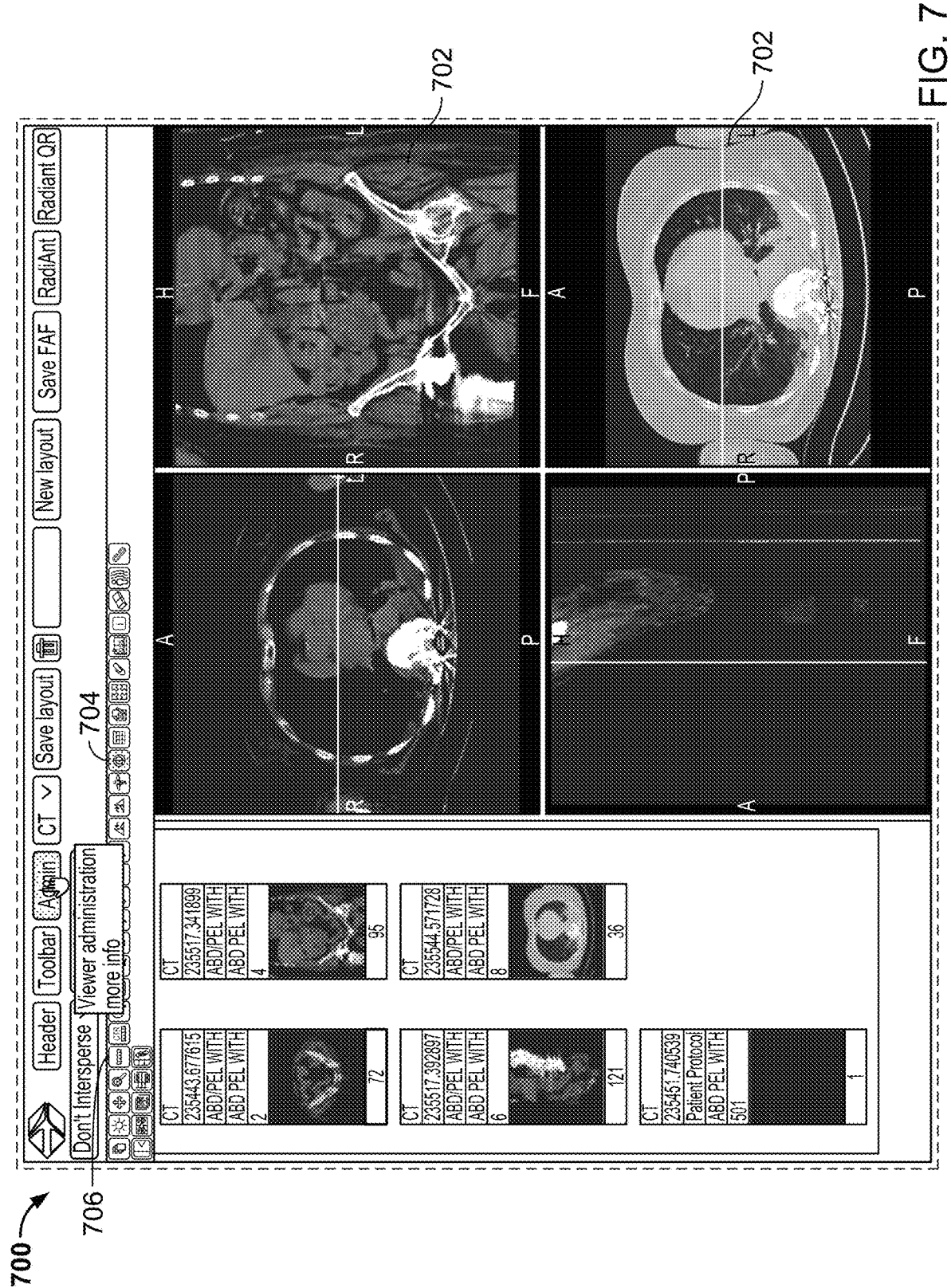
FIG. 7 is an example of a version of a user interface.

In some cases, a user's role (e.g., job title or organizational position) is associated with the user's available scope, because the role may which data and features the user can/cannot access. Working with this available scope (which may be configured by another user as described throughout this disclosure), the user may configure one or more exposed scopes corresponding to one or more pages. The one or more pages may be different types of pages (e.g., a worklist page as shown in FIG. 2 or a diagnostic viewer page as shown in FIG. 7) and/or different pages for a given type of page. For example, in some implementations, a user may configure a first diagnostic viewer page including a first exposed scope of interface elements from the user's available scope, and a second diagnostic viewer page including a second, different exposed scope of interface elements from the user's available scope. The first and second diagnostic viewer pages can be usable, for example, for different tasks/workflows, with each page including the interface elements most useful for performance of the different tasks. Different pages corresponding to the same type of page (such as two diagnostic viewer pages corresponding to different exposed scopes) can be referred to as different "layouts" of the type of page. Because, in some implementations, the user is given freedom to configure the user's own exposed scope(s) and page(s) once the user's available scope has been configured, the user (who best knows which interface elements are likely to be useful) can optimize their pages based on their own inclinations, needs, and experience.

Other types of scopes and relationships between scopes, besides those illustrated in FIG. 1, are also considered within the bounds of this disclosure. For example, U.S. Pat. No. 10,642,451 (incorporated by reference herein in its entirety) describes a universal scope, a prototype page scope, an unexposed page scope, and a scoping page scope, any one or more of which can included in implementations according to this disclosure. Correspondingly, as described in U.S. Pat. No. 10,642,451, scopes can be defined for particular pages/interfaces of an application and/or for an application as a whole. The permissioning process, as described herein, can includes elements described in reference to the "Log In To" process of U.S. Pat. No. 10,642,451.

The particular interface(s) in which permissioning is performed may affect the ease, efficiency, and accuracy of permissioning. For example, it would be possible to perform permissioning using a table interface in which each user is a row and each interface element is a column. To add a given interface element to the second user's available scope, the first user opens the table and marks the cell where the second user's row intersections the interface element's column. However, the first user would be likely to make errors and otherwise exhibit poor performance. For an interface or an application, there may be hundreds or thousands of interface elements available to add to/remove from the second user's available scope, making navigation of the interface difficult. Moreover, when the permissioning interface is divorced from the interface whose interface elements are being configured, it becomes unclear to users exactly what permissions are being granted and how available/unavailable interface elements will manifest in practice. For example, a set of interface elements may include a "measurement" table column in which medical data is displayed; a "measurement" tab that, when selected, allows users to perform measurements in x-ray images; and a "measurement" button that, when toggled, shows or hides measurement annotations added to x-ray images. If permissions for these interface elements are configured in an interface that does not include the medical data, measurement tools, the x-ray images, etc., it is probable that the configuring user will mistakenly enable/disable incorrect interface elements.

By contrast, implementations according to this disclosure allows users to perform permissioning directly in the interfaces that are being configured. FIG. 2 illustrates a first version (200*a*) of an interface (referred to generically as interface 200), the first version 200*a* being a standard, non-permissioning-related version that would be presented to the second user when the second user navigates to the interface 200 when using an application. The interface 200 relates to medical data for a series of patients. The first version 200*a* of the interface, which is accessible to the second user, includes both data interface elements that present information and function-linked interface elements that can be selected to perform certain operations in the application. Some interface elements both present information and are linked to functions. For example, a table 202 includes multiple columns having headers 204 indicative of the type of data in each column, such as "patient age" and "modality." The headers 204 and some of the data elements (such as "patient name" data elements) can be selected to sort the table 202 or view additional information, respectively. Buttons such as a "create CD file" button 206 and a "merge study" button 208 can be selected to execute corresponding operations.

The first version 200a includes the interface elements in the second user's exposed scope 106 for the interface 200. One or more interface elements that are in the second user's available scope 104, but not in the second user's exposed scope 106, may not be displayed. To have these interface elements presented in the first version 200a, the second user can perform suitable operations to add the interface elements to their exposed scope 106.

Figure 3:
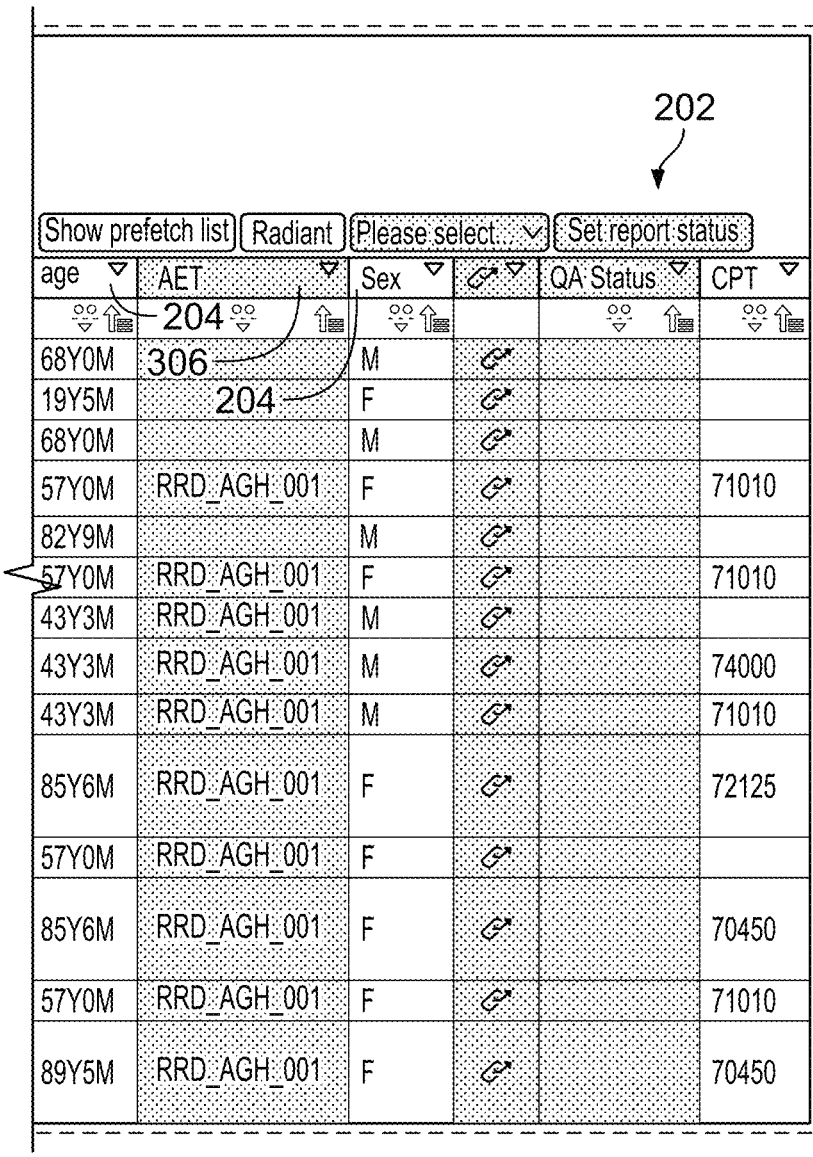

To perform permissioning for the interface 200 for the second user, the first user can open a second version (200b) of the interface 200, as shown in FIG. 3. The second version 200b (illustrated in truncated form for clarity, e.g., excluding additional table columns and buttons that would be included in the full version of the second version 200b) includes interface elements that are in the first user's available scope 102 for the interface 200, such as all the interface elements that are in the first user's available scope 102. In this example, because the second user's exposed scope 106 is a subset of the first user's available scope 102, all of the interface elements included in the first version 200a are also included in the second version 200b, such as several columns of the table 202 (having headers 204) and the buttons 206, 208. The second version 200b is a permissioning interface in which permissions for interface elements can be configured, as opposed to the standard interface of the first version 200a. The second version 200b is inaccessible to the second user, e.g., because the second user cannot configure their own permissions.

Interface elements in the second version 200b have one or more visual characteristics that indicate whether the interface elements are included in, or excluded from, the second user's available scope 104. In some implementations, inclusion in the second user's available scope 104 is indicated by one or more of different colors (e.g., green for included, red for excluded), shadings, brightnesses, border configurations (e.g., solid lines compared to dashed/dotted), graphic inclusion (e.g., a marking on the interface element to indicate that the interface element is included in the second user's available scope 104), and/or another visual characteristic. For example, in some implementations, interface elements included in the second user's available scope 104 have green backgrounds, while interface elements excluded from the second user's available scope 104 have red backgrounds. In the examples provided herein, interface elements included in the second user's available scope 104 are unshaded, while interface elements excluded from the second user's available scope 104 are shaded.

In this case, the second version 200b includes several interface elements (such as a "status" column of data having header 302, and buttons 304) that are in the second user's available scope 104 (as indicated by their visual characteristics) but that are not presented in the first version 200a. These interface elements 302, 304 are excluded from the second user's exposed scope 106, e.g., based on the second user's configuration/preferences for interface presentation.

Furthermore, the second version 200b includes interface elements that are not included in the second user's available scope 104. Such interface elements include several columns of data in the table 202 (for example, the "AET" column having header 306) and buttons including a prior hash button 308.

The first user can interact with interface elements in the second version 200b to toggle whether the interface elements are included in the second user's available scope 104.

As shown in FIG. 4, when the first user interacts with the AET header 306, the corresponding column becomes unshaded, indicating that the AET data is now accessible to the second user (is in the second user's available scope 104) and may, if the second user desires, be added to the second user's exposed scope 106 to appear in the first version 200a. The AET header 306 and column remain presented in the second version 200b after the interaction, because the AET header 306 and column remain in the first user's available scope 102. In this example, the first user also interacts with the prior hash button 308, causing the prior hash button 308 to become unshaded.

The type of interaction with an interface element that toggles the interface element's inclusion in the second user's available scope 104 can vary in different implementations. In some implementations, the interaction is a particular type of mouse click, e.g., a left-click, a middle-click, a right-click, or a double-click. In some implementations, the interactions is a tap or a tap-and-hold, e.g., a tap-and-hold with a hold having at least a threshold duration. Tap-based interactions can allow for permissioning to be performed using a touchscreen interface.

All, or nearly, interface elements in an interface may be subject to permissioning as described herein. For example, in some implementations, individual cells of a table can be selected/deselected to remove/add the data in the individual cells to the second user's available scope 104.

In some implementations, the second version 200b of the interface 200 is itself a usable interface with which the first user can interact for tasks besides permissioning. For example, the first user can view data, initiate operations, open menus and sub-menus, etc., in the second version 200b, in the same manner that the second user can perform corresponding operations in the first version 200a. This can help the first user understand operations in and the function of the interface 200, to provide added context for permissioning that can aid the first user in making correct permissioning decisions. In addition, the ability for the first user to interact with interface elements in the second version 200b to expose additional interface elements (e.g., in a sub-menu) can facilitate permissioning for the newly-exposed interface elements.

Figures 6A, 6B:
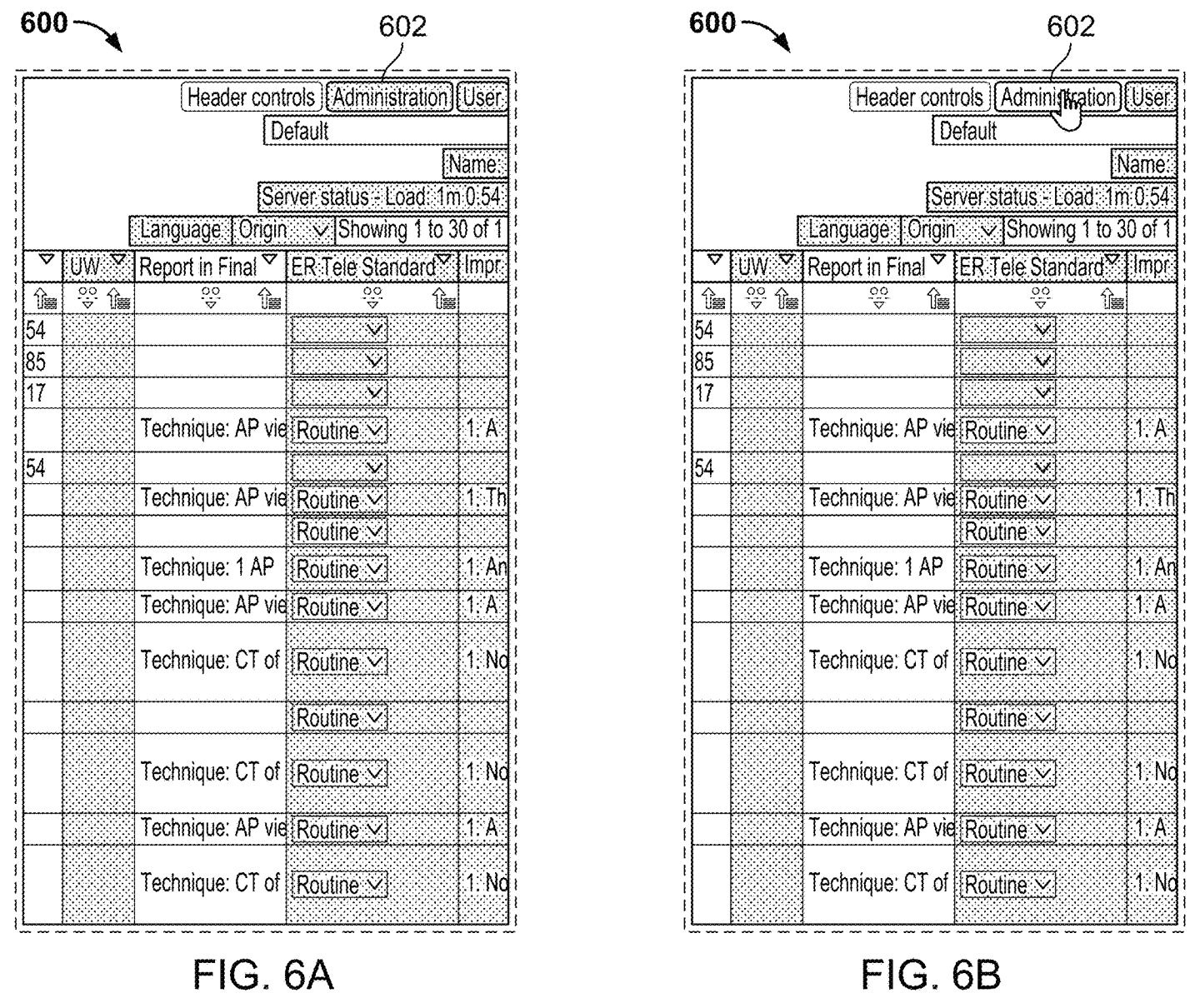
Figure 6C:
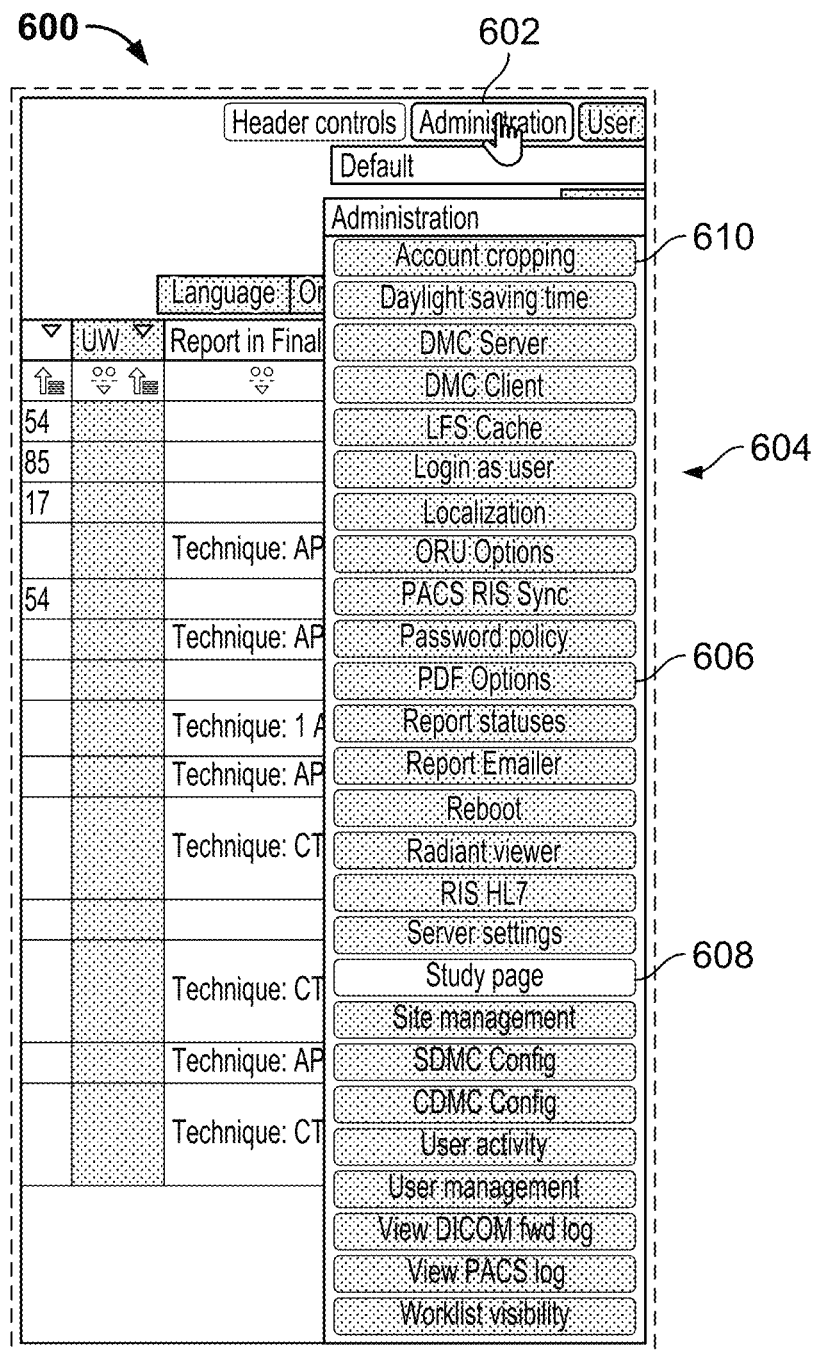

For example, FIGS. 6A-6C illustrate an interface 600 as the interface 600 can be presented to the first user to performing permissioning for the second user. The interface 600 is illustrated in truncated form for clarity. The interface 600 includes (in the first user's available scope 102) an administration button 602 that can be selected to perform administration tasks such as password changes, server-side operations, etc.

As shown in FIG. 6A, the administration button 602 is shaded, indicating that the administration button 602 is not included in the second user's available scope 104. To add the administration button 602 to the second user's available scope 104, the first user can perform a first type of interaction with the administration button 602, e.g., middle-click the administration button 602. Accordingly, as shown in FIG. 6B, the administration button 602 becomes unshaded.

However, even if the second user now has access to the administration button 602 itself, the second user may lack access to particular administration functions/sub-elements. Accordingly, the first user can perform a second type of interaction with the administration button 602 (such as left-click the administration button 602), to open an administration menu 604. The second type of interaction, for various implementations accordingly to this disclosure, causes the response associated with an interface element outside of permissioning. For example, when the second user opens the interface 600 to perform tasks (e.g., without performing permissioning), the second user can select the administration button 602 to open the administration menu 604. Similarly, in response to the first user performing the second type of interaction with the administration button 602, the same response occurs, e.g., presenting the administration menu 604. Accordingly, the first user, when performing permissioning, can also test the operations associated with different interface elements, explore sub-menus and hierarchical interfaces, and generally perform operations in interfaces to determine which interface elements should be included in the second user's available scope 104, leading to better permissioning results. Other permissioning schemes, which divorce permissioning operations from the underlying application interfaces that are being configured, may lead to worse results.

As shown in FIG. 6C, the opened administration menu 604 itself includes interface elements that have visual characteristics to indicate whether the interface elements are included in the second user's available scope 104. For example, a study page button 608 is unshaded to indicate its inclusion, while a PDF options button 606 is shaded to indicate its exclusion. An account cropping button 610 can also be added to/removed from the second user's available scope 104, permitting the first user to allow/disallow the second user from performing permissioning as described herein. This illustrates the highly flexible nature of interface element-based permissioning as described herein: because application functions, including permissioning itself, are associated with interface elements, permissions for the functions can be intuitively adjusted by controlling permissions for the corresponding interface elements. Moreover, because, in some implementations, the permissioning process is associated with scopes as described in reference to FIG. 1, permissioning need not be performed by a particular "administrator" user or performed imprecisely, without granular control. Rather, essentially any user can perform permissioning (assuming the user has the corresponding interface elements enabled), and the user can perform the permissioning on an interface element-by-interface element basis to fine-tune permissions for other users.

Referring again to the permissioning process of FIGS. 3-4, FIG. 5 illustrates a third version 200c of the interface 200 after the permissioning operations illustrated in FIG. 4 (adding the AET column and the prior hash button 308 to the second user's available scope 104) and after the AET column, with header 306, and the prior hash button 308 have been added to the second user's exposed scope 106. The third version 200c is an updated version of the interface 200 that is presented to the second user, e.g., is the first version 200a reflecting permissioning changes to interface elements of the interface 200. The third version 200c includes the prior hash button 308, allowing the second user to perform prior hash operations by interacting with the prior hash button 308, operations that would not be performable in the absence of the prior hash button 308. The third version 200c further includes the AET header 306 and corresponding column, allowing the second user to view AET data in the table 202, to sort the table 202 by AET data by clicking the header 306, to reposition the AET column in the table 202 by clicking-and-dragging the AET header 306, etc. Accordingly, permissioning the availability/visibility of interface elements can be equivalent to permissioning corresponding operations and functions of the application.

FIG. 7 illustrates an example of a diagnostic image viewing interface 700 usable for permissioning. The interface 700 includes patient images, such as images 702, for analysis. Various interface elements in the interface 700 can be interacted with by a first user to toggle whether the interface elements are in a second user's available scope 104, as described above. Moreover, in some implementations, the interface elements can be interacted with (e.g., using a different interaction method than for toggling the availability) to execute functions associated with the interface elements, open sub-menus and dialogue boxes stemming from the interface elements, etc. For example, an inversion button 704 is shaded, to indicate that the inversion button 704 is not included in the second user's available scope 104. The first user can middle-click the inversion button 704 to add it to the second user's available scope 104, or can left-click the inversion button 704 to invert light/dark in the images 702. A ruler button 706 is unshaded, to indicate that the ruler button 706 is included in the second user's available scope 104. The first user can tap the ruler button 706 to remove it from the second user's available scope 104, or can tap-and-hold on the ruler button 706 to cause display of a ruler that can be dragged onto the images 702 to perform measurements.

In some implementations, the look and feel with which interface elements are displayed in interfaces for permissioning (such as FIGS. 3-4, 6A-6C, and 7) matches the look and feel with which interface elements are displayed in the corresponding interfaces not used for permissioning (such as FIGS. 2 and 5). The "look and feel" represent the overall visual impression and overall user experience provided by the interface. The matching look and feel mean that the user's interactions with each interface can be carried out generally similarly.

For example, referring to FIG. 2, when the second user opens the first version 200a of the interface 200 to view patient data, the first version 200a is presented with a table 202, a first set of buttons 212 above the table 202, and a second set of buttons 214 above the first set of buttons 212. As shown in FIG. 3, this same general arrangement of interface elements is presented to the first user in the second version 200b of the interface 200, such that the look and feel of the two versions 200a, 200b match one another. An interface element in the first version 200a, such as a button in the second set of buttons 214, can be found generally in the same location in the second version 200b. Moreover, corresponding interface elements in the two versions 200a, 200b have identical appearances, except for the difference in visual characteristic (here, shading) to indicate which interface elements are included in the second user's available scope 104.

In various implementations, the matching look and feel can include one or more of, for example: relative positions of two or more interface elements; absolute positions of one or more interface elements in the interface; type of interface element; or interface element size.

Matching positions of interface elements can include matching ordering of the same interface elements in the interfaces for permissioning and the corresponding interfaces not used for permissioning, e.g., in the vertical and/or horizontal directions in the interfaces. For example, an interface element at the top of the first type of interface can also be found at the top of the second type of interface. A first interface element that is below a second interface element in the first type of interface is also below the second interface element in the second type of interface. A first collection of interface elements, such as a collection of buttons or a data table, has the same general relative positioning with respect to a second collection of interface elements in the first type of interface and the second type of interface.

The positioning of interface elements need not match exactly. For example, because a permissioning interface generally includes more interface elements than a corresponding non-permissioning interface, the arrangement of interface elements in the permissioning is adapted to include the greater number of interface elements. For example, in the first version 200a, the first set of buttons 212 includes four buttons, while the first set of buttons 212 in the second version 200b includes twenty-four buttons, such that the first set of buttons 212 in the second version 200b extends across more of the interface. Within a collection of interface elements, such as a set of buttons or a set of columns forming a table, the interface elements bay be re-ordered/re-ordered between the two versions, while maintaining the overall spatial relationships between collections of interface elements in the two versions.

Types of interface elements can include, for example, a button with text, a button with an icon, a toggle-able check box, a table column header, and a table cell, and the type of a given interface element can be the same between two versions of an interface, to maintain the matching look and feel of the two versions of the interface. A button in the first version is also a button in the second version; a toggle-able check box in the first version is also a toggle-able check box in the second version. Moreover, a type of interaction with an interface element in the first version of the interface (e.g., clicking a button, toggling a check-box, opening a drop-down menu, selecting a table cell, etc.) matches a type of interaction with the interface element in the second version of the interface.

Accordingly, the interface used for permissioning generally resembles the interface that is being configured and can be interacted with in the same ways as the interface that is being configured, with the exceptions being (i) interface elements in the former are visually marked to identify their inclusion in the second user's available scope 104, and (ii) the latter will generally (though not always) include more interface elements than the former, as the first user's available scope 102 is typically (though not always) larger than the second user's exposed scope 106. This matching can be distinguished from, for example, systems in which interfaces are always permissioned using lists or tables, regardless of how the permissioned interface and the interface elements thereof are presented in their standard context.

To provide the matching look and feel, in some implementations, a computer system providing a user interface (such as a user device or a remote device, e.g., a cloud computing system) accesses "look and feel elements" that dictate the visual display and available interaction types of an interface. Look and feel elements can include, for example, code elements (e.g., HTML elements) and/or images/graphics that can be accessed for inclusion in an interface element. The computer system accesses the look and feel elements and provides the interface based on the look and feel elements. Accordingly, the matching look and feel can be based on matching look and feel elements accessed by the computer system. The look and feel elements can be different from one another in order to provide (i) the different visual characteristics, in a permissioning interface, that dictate whether an interface element is included in the available scope of interface elements for the user being configured, and (ii) the additional interaction type for interface elements in a permissioning interface, to allow the interface elements to be interacted with to add/remove the interface elements from the available scope of interface elements.

Figure 8:
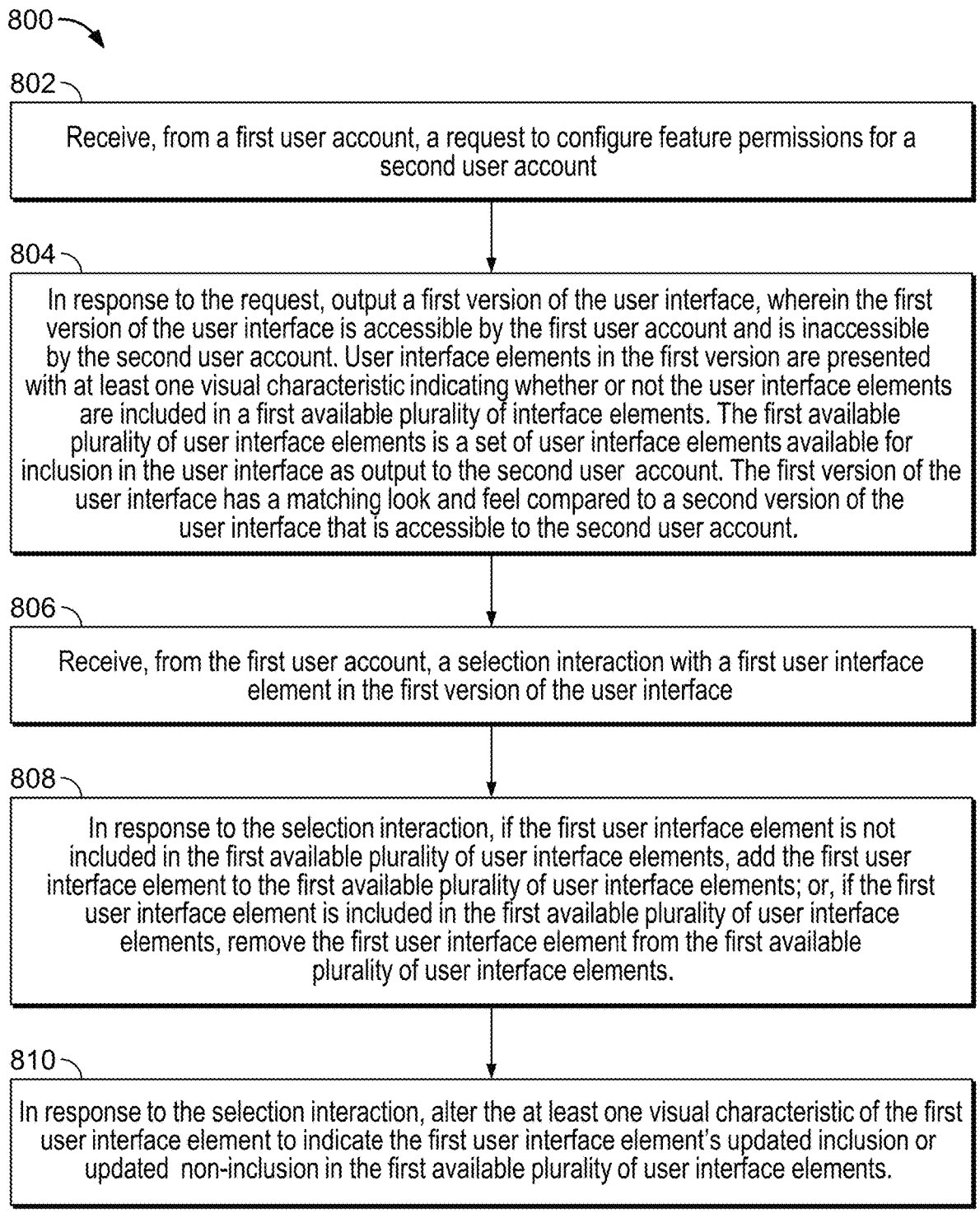
FIG. 8 is an example of a process according to some implementations of this disclosure.

FIG. 8 illustrates an example of a method 800 according to some implementations of this disclosure. The method 800 can be a computer-implemented performed by one or more computer systems, such as by one or more processors executing instructions stored in one or more non-transitory computer-readable media. For example, the method 800 can be performed by a local computer system (e.g., a computer system local to a first user account, such as a computer device operated by a user corresponding to the first user account), by a remote computer system (e.g., a cloud or server-side system communicably coupled to a local device by a network), and/or by a combination of local and remote computer systems.

In the method 800, a request to configure feature permissions for a second user account is received from a first user account (802). The first user account and the second user account correspond to the first user and second user described above; operations may be performed based on user accounts corresponding to users. For example, when a user logs into the first user account, the user can be assumed to be the first user. Accordingly, requests and interactions from a device on which the first user account is logged-in are requests and interactions from the first user.

The request to configure the feature permissions can be in response to the first user account providing a corresponding command or interaction. For example, the first user (operating the first user account) can click a "cropping" button to initiate a request to configure feature permissions for the second user. The computing system receives data indicative of the request.

In response to the request, a first version of the user interface is output to the first user account (804). The first version of the user interface is accessible by the first user account and in inaccessible by the second user account. The first version can be a permissioning interface, e.g., the second version 200b of the interface 200 described above.

For example, data representative of user interface elements in the first version of the user interface is provided to a display device and/or to a local computing device coupled to the display device. In some implementations, the method 800 is performed at least partially by a remote computing system, and the remote computing system provides the data representative of the interface elements to the local computing device over a network, e.g., the Internet. In some implementations, data representative of interface elements that are not in a user's available scope are not provided to the local device associated with the user. This can enhance security by, for example, preventing access to private data that a user is not permitted to view.

User interface elements in the first version of the user interface are presented with at least one visual characteristic indicating whether the user interface elements are included in a first available plurality of user interface elements. The first available plurality of user interface elements is a set of user interface elements available for inclusion in the user interface as output to the second user account. For example, the first available plurality of user interface elements can be the second user's available scope 104 described above. The user interface elements in the first available plurality of user interface elements are available for inclusion, for example, in versions 200a and 200c, e.g., if the second user accounts selects to include them in the second user's exposed scope 106.

For example, user interface elements that are included in the first available plurality of user interface elements can be colored green or unshaded, while user interface elements that are not included can be colored red or shaded.

The first version of the user interface has a matching look and feel compared to a second version of the user interface that is accessible to the second user account. The second version can be a standard version (e.g., a version not used for configuration of feature permissions), e.g., versions 200*a* and 200*c* of the interface 200 described above. As described above, the matching look and feel (the overall visual impression and overall user experience provided by the user interface) can include one or more of, for example: relative positions of two or more interface elements; absolute positions of one or more interface elements in the interface; type of interface element; or interface element size. In some implementations, the matching look and feel is provided by look and feel elements. Outputting the first version of the user interface can include accessing look and feel elements that define visual characteristics and/or interaction types with each user interface element; the look and feel elements at least partially match between the first version and the second version, e.g., except for the at least one visual characteristic indicating whether the user interface elements are included in the first available plurality of user interface elements.

A selection interaction with a first user interface element in the first version of the user interface is received from the first user account (806). For example, the first user interface element can be button 308 shown in FIG. 3. The selection interaction can be, for example, a middle-click. As described above, a different type of interaction can be used, in the same first version of the user interface, to activate functions associated with user interface elements, as if the user interface were a standard (non-permissioning) user interface.

In response to the selection interaction, if the first user interface element is not included in the first available plurality of user interface elements, the first user interface element is added to the first available plurality of user interface elements; or, if the first user interface element is included in the first available plurality of user interface elements, the first user interface element is removed from the first available plurality of user interface elements (808). Also, in response to the selection interaction, the at least one visual characteristic of the first user interface element is altered to indicate the first user interface element's updated inclusion or updated non-inclusion in the first available plurality of user interface elements.

For example, the first user interface element, if previously red (not included), can be switched to green (included), or, if previously green, can be switched to red. With the first user interface element added to the first available plurality of user interface elements, the second user may add the first user interface element to the second user's exposed scope for the user interface, so that the first user interface element is displayed when the second user account views the user interface. In some implementations, adding the first user interface element to the first available plurality of user interface elements includes adding the first user interface element to the exposed scope; and removing the first user interface element from the first available plurality of user interface elements including removing the first user interface element from the exposed scope.

In some implementations, the processes described herein for configuring feature permissions (e.g., any or all of the processes described with respect to FIGS. 2-7) can be applied to configure feature visibility, e.g., inclusion in the second user's exposed scope 106. For example, the second user can open a version of an interface that includes all the interface elements in the second user's available scope 104 that are compatible with inclusion in the interface. The interface elements are presented with at least one visual characteristic indicating whether the interface elements are included in the second user's exposed scope for the interface. For example, the visual characteristic can be any of the visual characteristics described above for indicating whether an interface element is included in the second user's available scope 104, e.g., shading or color. For example, an interface element can be green if the interface element is included in the exposed scope, and orange if the interface element is not included in the exposed scope. From within this interface, the second user can perform a first type of interaction with the interface elements to toggle whether the interface elements are included in the second user's exposed scope 106 for the interface (e.g., any of the interaction types described above, such as a middle-click), and the second user can perform a second type of interaction with the interface elements to activate functions associated with the interface elements, as if the interface were a standard interface not related to interface display configuration. When the second user has completed this configuration, the second user can return to the standard version of the interface, which is updated to reflect the second user's selections of which interface elements are, or are not, included in the second user's exposed scope 106 for the interface.

In some implementations, when a user has completed configuration of an exposed scope for an interface, the user can save the configuration as a specific layout to which the user may subsequently return to access the interface elements included in the exposed scope. As noted above, for each user, a given type of page (e.g., a worklist page) may have multiple saved layouts, each layout corresponding to the a respective exposed scope including a subset of the user's available scope. The user may repeat the exposed scope configuration process (e.g., in some implementations, by interacting with interface elements in a version of a page in which the interface elements are visually marked to indicate inclusion in the exposed scope) to configure as many layouts as the user deems necessary. In some implementations, the interface elements on a page include one or more interface elements selectable to switch to a selected layout. For example, a drop-down menu can include multiple layouts, each including a different exposed scope of interface elements from the user's available scope.

The term "system," as used in this disclosure, may encompass all apparatuses, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of nonvolatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firm ware, software, or in combinations of them. The apparatus can be implemented in a computer program product tangibly embodied in an information carrier, e.g., in a machine readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

A number of implementations have been described. Nevertheless, it will be understood that various modifications may be made. For example, although permissioning is described in reference to various examples of types of interfaces, other types of interfaces are also within the scope of this disclosure. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for configuring feature permissions, comprising:
   receiving, from a first user account, a request to configure feature permissions for a second user account;
   in response to the request, outputting a first version of a user interface, wherein the first version of the user interface is accessible by the first user account and is inaccessible by the second user account,
      wherein user interface elements in the first version of the user interface are presented with at least one visual characteristic indicating whether or not the user interface elements are included in a first available plurality of user interface elements,
      wherein the first available plurality of user interface elements is a set of user interface elements available for inclusion in the user interface as output to the second user account, and
      wherein the first version of the user interface has a matching look and feel compared to a second version of the user interface that is accessible to the second user account;
   receiving, from the first user account, a selection interaction with a first user interface element in the first version of the user interface; and
   in response to the selection interaction,
      if the first user interface element is not included in the first available plurality of user interface elements, adding the first user interface element to the first available plurality of user interface elements, or,
      if the first user interface element is included in the first available plurality of user interface elements, removing the first user interface element from the first available plurality of user interface elements; and
   in response to the selection interaction, altering the at least one visual characteristic of the first user interface element to indicate the first user interface element's updated inclusion or updated non-inclusion in the first available plurality of user interface elements.

2. The computer-implemented method of claim 1, wherein the selection interaction comprises a first type of selection interaction, and wherein the method comprises:
   receiving, from the first user account, a second type of selection interaction with the first user interface element; and
   in response to the second type of selection interaction, executing a function associated with the first user interface element.

3. The computer-implemented method of claim 2, wherein the first type of selection interaction comprises a first type of click, and wherein the second type of selection interaction comprises a second type of click.

4. The computer-implemented method of claim 2, wherein the function associated with the first user interface element is a function executed when the second user account performs the second type of selection interaction with the first user interface element in the second version of the user interface.

5. The computer-implemented method of claim 2, wherein the function associated with the first user interface element comprises opening a sub-menu.

6. The computer-implemented method of claim 1, wherein the first version of the user interface comprises a permissioning interface, and
wherein the second version of the user interface comprises a standard interface.

7. The computer-implemented method of claim 1, wherein the at least one visual characteristic comprises a color.

8. The computer-implemented method of claim 1, wherein the matching look and feel comprises the first user interface element being the same type of user interface element in the first version and the second version.

9. The computer-implemented method of claim 1, wherein the first user interface element is included in a collection of user interface elements, and
wherein the matching look and feel comprises the collection of user interface elements having the same placement in the first version and the second version.

10. The computer-implemented method of claim 1, wherein the matching look and feel comprises the first user interface element having the same relative placement, with respect to a second user interface element, in the first version and the second version.

11. The computer-implemented method of claim 1, wherein the first user interface element is associated with a type of data, such that adding the first user interface element to the first available plurality of user interface elements comprises permitting the second user account to view the type of data when viewing the user interface.

12. The computer-implemented method of claim 1, wherein the first user interface element is associated with a function, such that adding the first user interface element to the first available plurality of user interface elements comprises permitting the second user account to perform the function when viewing the user interface.

13. The computer-implemented method of claim 1, comprising:
subsequent to adding the first user interface element to the first available plurality of user interface elements or removing the first user interface element from the first available plurality of user interface elements, outputting, to the second user account, the second version of the user interface,
wherein outputting the second version of the user interface comprises transmitting, to a device associated with the second user account, data representative of the first user interface element.

14. The computer-implemented method of claim 1, wherein, based on the first user interface element being added to the first available plurality of user interface elements, the second user account is permitted to add the first user interface element to the second version of the user interface.

15. The computer-implemented method of claim 1, wherein the first user interface element comprises a header of a data column.

16. The computer-implemented method of claim 1, comprising:
receiving, from the second user account, a request to configure feature visibility for the user interface;
in response to the request to configure feature visibility, outputting a third version of the user interface, wherein user interface elements in the third version of the user interface are presented with at least one visual characteristic indicating whether or not the user interface elements are included in an exposed plurality of user interface elements for the interface,
wherein the exposed plurality of user interface elements is a set of user interface elements included in the second version of the user interface;
receiving, from the second user account, a second selection interaction with a second user interface element in the third version of the user interface; and
in response to the second selection interaction,
if the second user interface element is not included in the exposed plurality of user interface elements, adding the second user interface element to the exposed plurality of user interface elements, or,
if the second user interface element is included in the exposed plurality of user interface elements, removing the second user interface element from the exposed plurality of user interface elements; and
in response to the selection interaction, altering the at least one visual characteristic of the second user interface element to indicate the second user interface element's updated inclusion or updated non-inclusion in the exposed plurality of user interface elements.

17. A non-transitory, computer-readable storage medium storing instructions that, when executed by one or more processors, cause the one or more processors to perform operations comprising:
receiving, from a first user account, a request to configure feature permissions for a second user account;
in response to the request, outputting a first version of a user interface, wherein the first version of the user interface is accessible by the first user account and is inaccessible by the second user account,
wherein user interface elements in the first version of the user interface are presented with at least one visual characteristic indicating whether or not the user interface elements are included in a first available plurality of user interface elements,
wherein the first available plurality of user interface elements is a set of user interface elements available for inclusion in the user interface as output to the second user account, and
wherein the first version of the user interface has a matching look and feel compared to a second version of the user interface that is accessible to the second user account;
receiving, from the first user account, a selection interaction with a first user interface element in the first version of the user interface; and
in response to the selection interaction,
if the first user interface element is not included in the first available plurality of user interface elements, adding the first user interface element to the first available plurality of user interface elements, or,
if the first user interface element is included in the first available plurality of user interface elements, removing the first user interface element from the first available plurality of user interface elements; and
in response to the selection interaction, altering the at least one visual characteristic of the first user interface element to indicate the first user interface element's updated inclusion or updated non-inclusion in the first available plurality of user interface elements.

18. The non-transitory, computer-readable storage medium of claim 17, wherein the selection interaction comprises a first type of selection interaction, and wherein the method comprises:
receiving, from the first user account, a second type of selection interaction with the first user interface element; and in response to the second type of selection interaction, executing a function associated with the first user interface element.

19. A system comprising:
one or more processors; and
a storage medium storing instructions that, when executed by the one or more processors, cause the one or more processors to perform operations comprising:
receiving, from a first user account, a request to configure feature permissions for a second user account;
in response to the request, outputting a first version of a user interface, wherein the first version of the user interface is accessible by the first user account and is inaccessible by the second user account,
   wherein user interface elements in the first version of the user interface are presented with at least one visual characteristic indicating whether or not the user interface elements are included in a first available plurality of user interface elements,
   wherein the first available plurality of user interface elements is a set of user interface elements available for inclusion in the user interface as output to the second user account, and
   wherein the first version of the user interface has a matching look and feel compared to a second version of the user interface that is accessible to the second user account;
receiving, from the first user account, a selection interaction with a first user interface element in the first version of the user interface; and
in response to the selection interaction,
   if the first user interface element is not included in the first available plurality of user interface elements, adding the first user interface element to the first available plurality of user interface elements, or,
   if the first user interface element is included in the first available plurality of user interface elements, removing the first user interface element from the first available plurality of user interface elements; and
in response to the selection interaction, altering the at least one visual characteristic of the first user interface element to indicate the first user interface element's updated inclusion or updated non-inclusion in the first available plurality of user interface elements.

20. The system of claim 19, wherein the selection interaction comprises a first type of selection interaction, and wherein the method comprises:
receiving, from the first user account, a second type of selection interaction with the first user interface element; and
in response to the second type of selection interaction, executing a function associated with the first user interface element.

* * * * *